(12) United States Patent
Takatsuka et al.

(10) Patent No.: US 12,716,770 B2
(45) Date of Patent: Aug. 25, 2026

(54) MEASUREMENT DEVICE, MEASUREMENT METHOD, AND PROGRAM

(71) Applicants: Sony Group Corporation, Tokyo (JP); Sony Semiconductor Solutions Corporation, Atsugi (JP)

(72) Inventors: Susumu Takatsuka, Tokyo (JP); Noribumi Shibayama, Atsugi (JP); Hiroki Tetsukawa, Tokyo (JP)

(73) Assignees: Sony Group Corporation, Tokyo (JP); Sony Semiconductor Solutions Corporation, Atsugi (JP)

( * ) Notice: Subject to any disclaimer, the term of this patent is extended or adjusted under 35 U.S.C. 154(b) by 343 days.

(21) Appl. No.: 18/563,396

(22) PCT Filed: Mar. 30, 2022

(86) PCT No.: PCT/JP2022/016048
§ 371 (c)(1),
(2) Date: Nov. 22, 2023

(87) PCT Pub. No.: WO2022/254942
PCT Pub. Date: Dec. 8, 2022

(65) Prior Publication Data

US 2024/0271992 A1 Aug. 15, 2024

(30) Foreign Application Priority Data

Jun. 3, 2021 (JP) ................................ 2021-093775

(51) Int. Cl.
*G01H 9/00* (2006.01)
*G01V 1/00* (2006.01)

(52) U.S. Cl.
CPC ............... *G01H 9/00* (2013.01); *G01V 1/001* (2013.01)

(58) Field of Classification Search
CPC ................................ G01H 9/00; G01V 1/001
See application file for complete search history.

(56) References Cited

U.S. PATENT DOCUMENTS 5,504,719 A * 4/1996 Jacobs ..................... G01H 9/00 367/149
10,641,649 B1 * 5/2020 Butman ............ H04B 10/6163
(Continued)

FOREIGN PATENT DOCUMENTS

CN 108801439 A * 11/2018 ............... G01H 9/00
CN 111189528 A * 5/2020 ............... G01H 9/00
(Continued)

OTHER PUBLICATIONS

Fuse Yohei et al: "Sound recovery using vibration mode of an object in video", IEICE Technical Report, SP, IEICE, JP, Jun. 21, 2018 (Jun. 21, 2018)vol. 118, No. 112 (SP2018-5), pp. 19-24, XP009541753, Retrieved from the Internet:URL:https://ken.ieice.org/ken/paper/20180628б1ek/eng/.
(Continued)

*Primary Examiner* — Stephanie E Bloss
*Assistant Examiner* — Diana Hancock
(74) *Attorney, Agent, or Firm* — XSENSUS LLP

(57) ABSTRACT

A measurement device includes an imaging control unit that causes an imaging unit to image a predetermined target object in water, and a measurement unit that measures a sound wave in the water on the basis of an image taken by the imaging control unit.

20 Claims, 12 Drawing Sheets

(56) References Cited

U.S. PATENT DOCUMENTS

| | | | | |
|---|---|---|---|---|
| 11,385,133 | B2 * | 7/2022 | Tekeli | G01H 17/00 |
| 2003/0072219 | A1 | 4/2003 | Ruffa | |
| 2018/0217067 | A1 * | 8/2018 | Gallager | G01N 21/8507 |

FOREIGN PATENT DOCUMENTS

| | | | |
|---|---|---|---|
| JP | 2012-516432 | A | 7/2012 |
| JP | 2019-165687 | A | 10/2019 |
| JP | 2021-105594 | A | 7/2021 |
| WO | 2007/049693 | A1 | 5/2007 |
| WO | 2013/183302 | A1 | 12/2013 |
| WO | 2017/022384 | A1 | 2/2017 |

OTHER PUBLICATIONS

International Search Report and Written Opinion mailed on Jun. 21, 2022, received for PCT Application PCT/JP2022/016048, filed on Mar. 30, 2022, 10 pages including English Translation.

Fuse et al., "Sound recovery using vibration mode of an object in video", The Institute Of Electronics, Information and Communication Engineers, IEICE Technical Report, PRMU2018-25, SP2018-5, Jun. 2018, pp. 19-24 (6 pages including English Abstract).

* cited by examiner

FIG. 2

BUBBLE

SMOKE

SEA BED SAND

MARINE SNOW

MICROORGANISM

FIG. 3

| | | |
|---|---|---|
| MEASUREMENT SETTINGS | MEASUREMENT START CONDITION | CONDITION FOR STARTING MEASUREMENT<br>TIME or RECEPTION OF MEASUREMENT START COMMAND |
| | OPERATION TIME SHEET | SETTINGS OF OPERATION OF ILLUMINATION UNIT |
| | IDENTIFICATION PROGRAM | RULE BASE or MACHINE LEARNING |
| | VIBRATION MEASUREMENT PROGRAM | RULE BASE or MACHINE LEARNING |
| | MEASUREMENT END CONDITION | CONDITION FOR ENDING MEASUREMENT<br>TIME or RECEPTION OF MEASUREMENT END COMMAND |

FIG. 10

AMPLITUDE
FREQUENCY
AMPLITUDE
FREQUENCY
AMPLITUDE
FREQUENCY
1
1
1
LAYER A
LAYER B
LAYER C
DEPTH t1
FREQUENCY
AMPLITUDE
100
t2
f11
FREQUENCY
AMPLITUDE
100
100
t3
f11
FREQUENCY
AMPLITUDE

MEASUREMENT DEVICE, MEASUREMENT METHOD, AND PROGRAM

CROSS-REFERENCE TO RELATED APPLICATIONS

The present application is based on PCT filing PCT/JP2022/016048, filed Mar. 30, 2022, which claims priority from Japanese Patent Application No. 2021-093775, filed Jun. 3, 2021, the entire contents of each are incorporated herein by reference.

TECHNICAL FIELD

The present technology relates to a measurement device, a measurement method, and a program, particularly to a technology of measuring a sound wave in water.

BACKGROUND ART

There has been proposed a measurement device that irradiates excitation light having a predetermined wavelength to excite phytoplankton and measures intensity of fluorescence emitted from the excited phytoplankton to measure abundance of the phytoplankton (see, for example, Patent Document 1).

CITATION LIST

Patent Document

Patent Document 1 Japanese Patent Application Laid-Open No. 2019-165687

SUMMARY OF THE INVENTION

Problems to be Solved by the Invention

By the way, in the sea (in water), various sound waves such as low-frequency sound waves generated by earth's crust activity and sound waves emitted by marine organisms such as whale are emitted.

And, as a device for measuring a sound wave generated in the sea, a hydrophone using a piezoelectric microphone is known.

However, it is difficult for the hydrophone to detect a sound wave having an ultra-low frequency, for example, less than 1 Hz, and the hydrophone has not reached a level of efficiently measuring a sound wave in water.

Therefore, an object of the present technology is to efficiently measure a sound wave propagating in water.

Solutions to Problems

A measurement device according to the present technology includes an imaging control unit that causes an imaging unit to image a predetermined target object in water, and a measurement unit that measures a sound wave in the water on the basis of an image taken by the imaging unit.

With this arrangement, the measurement device can measure a sound wave in water with a simple configuration.

BRIEF DESCRIPTION OF DRAWINGS

FIG. 2 is a diagram for explaining target objects and movement of the target objects.

FIG. 3 is a diagram for explaining an example of measurement settings.

FIG. 10 is a diagram for explaining a use example 1.

MODE FOR CARRYING OUT THE INVENTION

Hereinafter, an embodiment will be described in the following order.

<1. Configuration of measurement device>
<2. Regarding target object>
<3. Measurement method as embodiment>
<4. Vibration measurement processing>
<5. Distance measurement processing>
<6. Use examples>
<7. Another configuration example of measurement device>
<8. Summary of embodiment>
<9. Present technology>

1. Configuration of Measurement Device

First, a configuration of a measurement device 1 according to an embodiment of the present technology will be described.

The measurement device 1 is a device that measures a sound wave propagating in water by measuring vibration of a target object, for example, a microorganism or a fine particle existing in the water such as the sea.

Here, the microorganism used as the target object is an underwater microorganism such as phytoplankton, zooplankton, or a larva of an underwater organism existing in water. Furthermore, the fine particle used as the target object is microplastic, dust, sand, marine snow, a bubble, or the like. However, these are examples, and the target object may be an object other than these.

Furthermore, the sound wave propagating in water is various sound waves such as a low-frequency sound wave generated by earth's crust activity and a sound wave generated by a marine organism such as a whale, and is a low-frequency sound wave of 0.1 Hz to 20 Hz, for example. However, the sound wave may be a sound wave having a frequency of 20 Hz or more.

Figure 1:
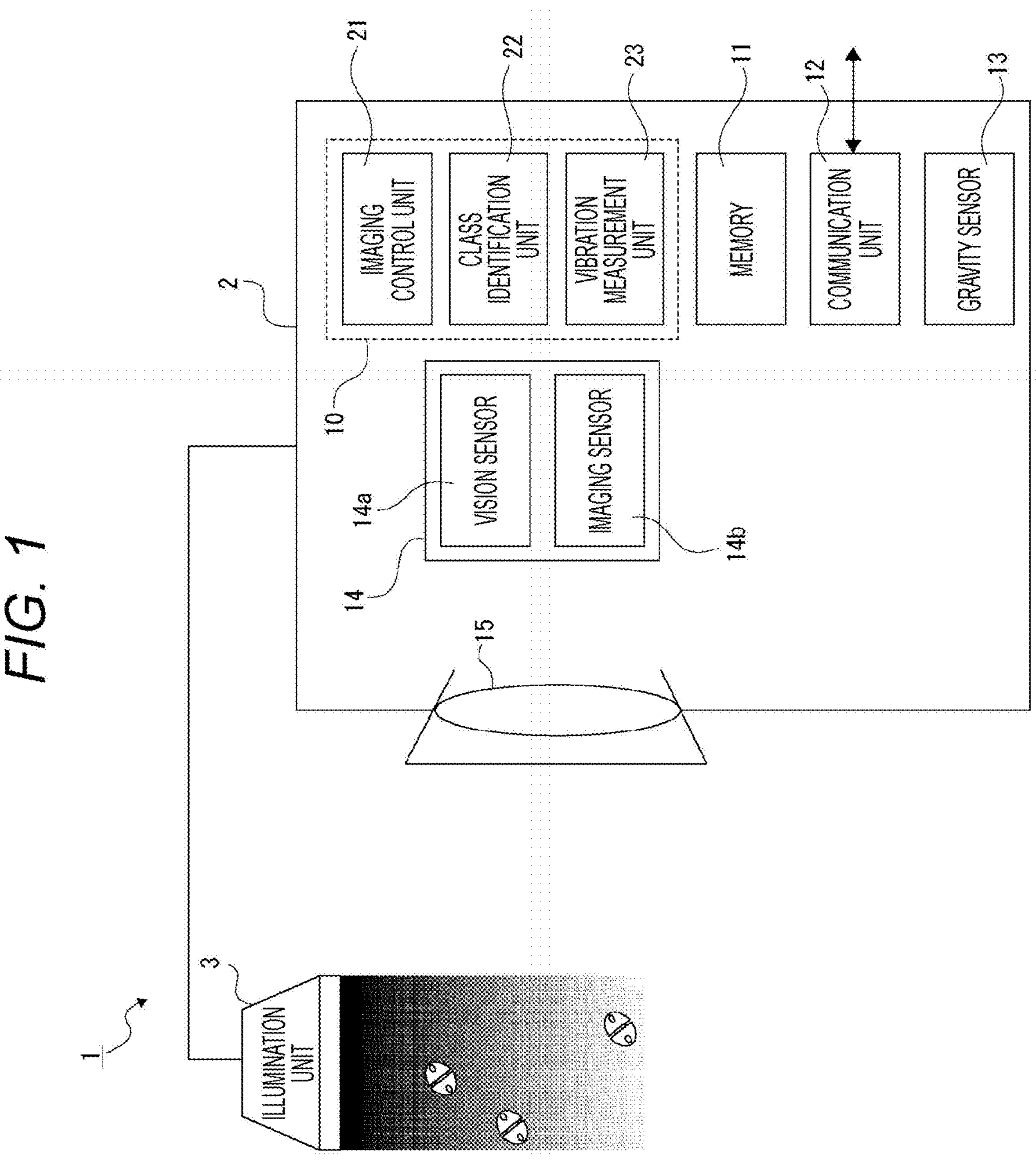
FIG. 1 is a diagram for explaining a configuration of a measurement device 1 according to an embodiment.

FIG. 1 illustrates a configuration of the measurement device 1. As illustrated in FIG. 1, the measurement device 1 includes a main body 2 and an illumination unit 3. Note that the illumination unit 3 may be provided in the main body 2.

The main body 2 includes a control unit 10, a memory 11, a communication unit 12, a gravity sensor 13, an imaging unit 14, and a lens 15.

The control unit 10 includes, for example, a microcomputer including a central processing unit (CPU), a read only memory (ROM), and a random access memory (RAM) and performs overall control of the measurement device 1. In the first embodiment, the control unit 10 functions as an imaging control unit 21, a class identification unit 22, and a vibration measurement unit 23. Note that the imaging control unit 21, the class identification unit 22, and the vibration measurement unit 23 will be described later in detail.

Furthermore, the control unit 10 performs processing of reading data stored in the memory 11, processing of storing data in the memory 11, and transmission and reception of various kinds of data to and from an external device via the communication unit 12.

The memory 11 includes a nonvolatile memory. The communication unit 12 performs wired or wireless data communication with the external device. The gravity sensor 13 detects gravitational acceleration (direction of gravity) and outputs a detection result to the control unit 10. Note that the measurement device 1 may be configured not to include the gravity sensor 13.

The imaging unit 14 includes both of or one of a vision sensor 14*a* and an imaging sensor 14*b*. The vision sensor 14*a* is a sensor called dynamic vision sensor (DVS) or event-based vision sensor (EVS). The vision sensor 14*a* captures an image of a predetermined imaging range in water through the lens 15.

The vision sensor 14*a* is an asynchronous image sensor in which a plurality of pixels including photoelectric conversion elements is two-dimensionally arranged and, in addition, a detection circuit that detects an address event in real time is provided in each pixel. Note that the address event is an event that occurs in each address allocated to each of the plurality of two-dimensionally arranged pixels according to an incident light amount and is, for example, an event in which a current value of a current based on a charge generated in the photoelectric conversion element or a change amount thereof exceeds a certain threshold.

The vision sensor 14*a* detects whether or not the address event occurs for each pixel, and, in a case where the occurrence of the address event is detected, the vision sensor reads a pixel signal as pixel data from the pixel in which the address event has occurred. That is, the vision sensor 14*a* acquires pixel data asynchronously according to an amount of light incident on each of the plurality of two-dimensionally arranged pixels.

The vision sensor 14*a* performs an operation of reading a pixel signal on the pixel in which the occurrence of the address event has been detected and thus can perform reading at an extremely high speed, as compare with a synchronous image sensor that performs a reading operation on all pixels at a predetermined frame rate, and has a small amount of data read as one frame.

Therefore, the measurement device 1 can detect a motion of the target object more quickly by using the vision sensor 14*a*. Furthermore, the vision sensor 14*a* can reduce the amount of data and also reduce power consumption.

The imaging sensor 14*b* is, for example, a charge coupled device (CCD) or complementary metal-oxide-semiconductor (CMOS) image sensor, and a plurality of pixels including photoelectric conversion elements is two-dimensionally arranged. The imaging sensor 14*b* captures an image of a predetermined imaging range through the lens 15 at certain intervals according to a frame rate to generate image data. Note that the measurement device 1 can use a zone plate, a pinhole plate, or a transparent plate, instead of the lens 15.

The vision sensor 14*a* and the imaging sensor 14*b* are arranged to capture an image of substantially the same imaging range through the lens 15. For example, a one-way mirror (not illustrated) is only required to be arranged between the vision sensor 14*a* and the imaging sensor 14*b* and the lens 15 such that one part of light dispersed by the one-way mirror is incident on the vision sensor 14*a*, and the other part thereof is incident on the imaging sensor 14*b*.

The illumination unit 3 is driven on the basis of control of the control unit 10, and irradiates the imaging range of the imaging unit 14 with light. The illumination unit 3 can emit light while switching light having different wavelengths, and, for example, emits light having different wavelengths that vary from one another by 10 nm.

2. Regarding Target Object

Figure 2:
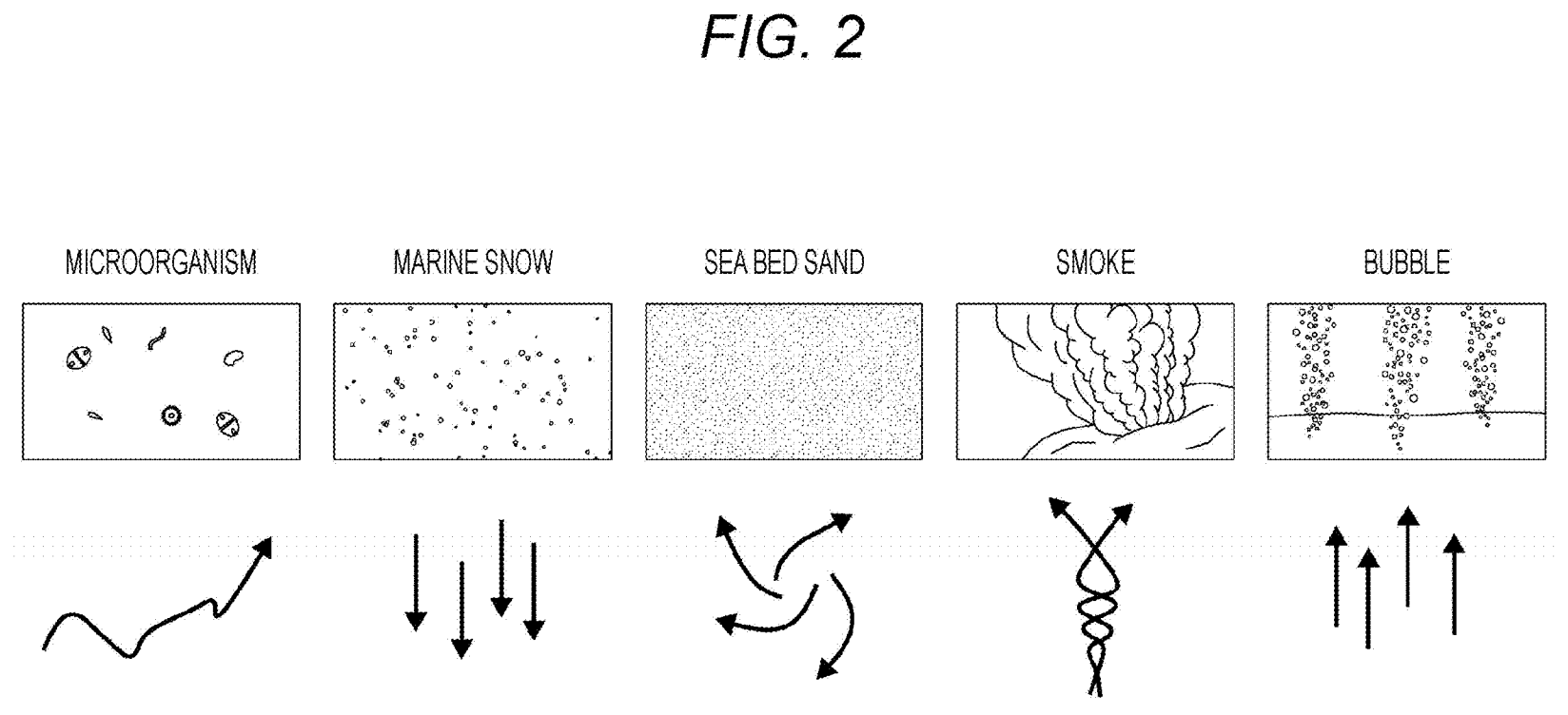

FIG. 2 is a diagram for explaining target objects and movement of the target objects. Note that in FIG. 2, images of the target objects are illustrated in an upper stage, and moving directions of the target objects are indicated by arrows in a lower stage.

As illustrated in FIG. 2, the target objects include microorganisms, marine snow, sea bed sand, smoke, and bubbles.

And, it is known that some microorganisms exhibit taxis by being irradiated with light having a specific wavelength. Here, the taxis is innate behavior of an organism reacting to light (external stimulus). Therefore, when a microorganism having taxis is irradiated with light having a specific wavelength, the microorganism moves according to the taxis.

The marine snow is, for example, particles such as a waste product of plankton present in the sea, a dead body of plankton, or a decomposition product thereof, and moves so as to sink in the sea (in the direction of gravity).

The sea bed sand is, for example, particles such as sand precipitating on the sea bed, and moves in a swirling manner by a sea bed flow.

The smoke is, for example, a phenomenon in which high temperature water heated by geothermal heat is ejected from a hydrothermal vent in the sea bed. And, the hot water blown out from the hydrothermal vent may reach several hundred degrees, and since the hot water abundantly contains heavy metals and hydrogen sulfide as dissolved components, black or white smoke reacts with seawater to become smoke and moves upward while swirling.

The bubbles are, for example, natural gas such as methane and carbon dioxide leaking (spouting) from the sea bed, carbon dioxide artificially injected by carbon dioxide storage (CCS) and leaking from a reservoir, or the like, and move so as to rise from the sea bed.

As described above, some target objects, not only microorganisms but also fine particles move in a known moving direction, and the measurement device 1 as the first embodiment specifies a microorganism and a fine particle whose moving direction is known as target objects.

3. Measurement Method as Embodiment

Next, an outline of a method for measuring a target organism as an embodiment will be described.

FIG. 3 is a diagram for explaining an example of measurement settings.

The control unit 10 performs measurement according to measurement settings specified in advance such as the one illustrated in FIG. 3. As the measurement settings, a measurement start condition, an operation time sheet of the illumination unit 3, an identification program (identification method), a vibration measurement program (vibration measurement method), and a measurement end condition are specified.

As the measurement start condition, a condition for starting measurement is specified, and for example, a time of start of measurement, reception of a measurement start command input via the communication unit 12, or the like is specified.

In the operation time sheet, a time sheet for operating the illumination unit 3 is specified. For example, the operation time sheet is specified so that wavelengths vary from one another by 10 nm in a range from 400 nm to 700 nm, specifically, 400 nm, 410 nm, . . . , 690 nm, and 700 nm, and light is emitted so that an off state is sandwiched between the wavelengths.

In this manner, in the operation time sheet, a wavelength and a timing of emission of light from the illumination unit 3 to the imaging range are specified. Note that a timing at which the illumination unit 3 is turned off, that is, a timing at which light is not emitted is provided to image light in a case where a target object emits (excites) light. Furthermore, by sandwiching the off state between the wavelengths, an effect that the asynchronous vision sensor 14*a* can easily detect an event for each wavelength is produced.

As the identification program, a program (method) for identifying a type of target object is specified, and for example, identification by machine learning, identification by rule base, or the like is specified.

As the vibration measurement program, a program (method) for measuring vibration of a target object is specified, and for example, measurement by machine learning, measurement by rule base, or the like is specified.

As the measurement end condition, a condition for ending measurement is specified, and for example, a time of end of measurement, reception of a measurement end command input via the communication unit 12, or the like is specified.

Figure 4:
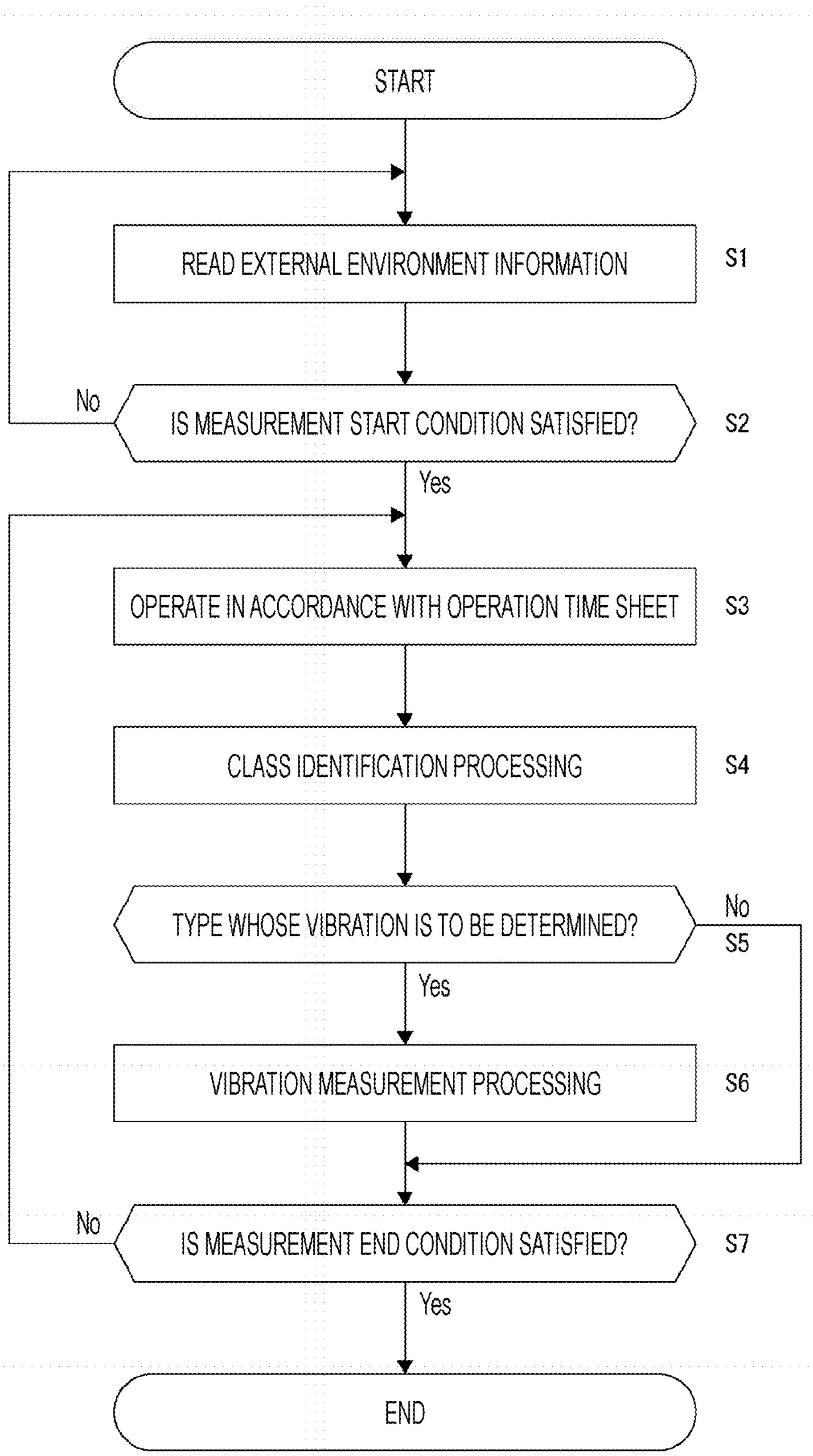
FIG. 4 is a diagram for explaining an example of an operation time sheet.

FIG. 4 is a flowchart illustrating a processing procedure of a measurement method. As illustrated in FIG. 4, in step S1, the control unit 10 reads external environment information, which will be described in detail later. Then, in step S2, the control unit 10 determines whether the measurement start condition specified in the measurement settings is satisfied. And, the control unit 10 repeats steps S1 and S2 until the measurement start condition is satisfied.

On the other hand, in a case where the measurement start condition is satisfied (Yes in step S2), in step S3, the imaging control unit 21 causes the illumination unit 3 to emit light while switching light having different wavelengths according to the operation time sheet specified in the measurement setting. Furthermore, the imaging control unit 21 causes the imaging unit 14 to image the imaging range every time the wavelength and on/off of the light emitted from the illumination unit 3 are switched, and acquires pixel data and image data. Thereafter, in step S4, the class identification unit 22 executes class identification processing.

In the class identification processing, the class identification unit 22 identifies (specifies) a type of target object on the basis of the image (the pixel data and the image data) taken by the imaging unit 14. The class identification unit 22 derives identification information from the image taken by the imaging unit 14, and detects a target object by comparing definition information stored in the memory 11.

The definition information is provided for each target object and stored in the memory 11. The definition information includes a type, a moving direction, and image information of a target object.

The movement information is information detected mainly on the basis of an image taken by the vision sensor 14*a*, and is information based on movement of a target object such as the one illustrated in the lower stage of FIG. 3. In a case where the target object is a microorganism, the movement information is information such as a moving direction (positive or negative) with respect to a light source, a speed, and a trajectory. In a case where the target object is a fine particle, the movement information is information such as a moving direction, a speed, and a trajectory.

The image information is information detected mainly on the basis of an image taken by the imaging sensor 14*b*, and is external information of the target object. Note that the image information may be information detected on the basis of an image taken by the vision sensor 14*a*.

Furthermore, the definition information may include a gravity direction detected by the gravity sensor 13 and external environment information acquired via the communication unit 12. Note that the external environment information can be a depth, positional coordinates (latitude and longitude and plane rectangular coordinates of a measurement point), electrical conductivity, temperature, ph, concentration of gas (e.g. methane, hydrogen, and helium), concentration of metal (e.g. manganese and iron), and the like.

The class identification unit 22 detects an object existing within the imaging range on the basis of the image (pixel data) taken by the vision sensor 14*a*. For example, the class identification unit 22 creates one image on the basis of pixel data input within a predetermined period and detects, as one object, a pixel group within a predetermined range in which a motion has been detected in the image.

Furthermore, the class identification unit 22 tracks the object between a plurality of frames by pattern matching or the like. Then, the class identification unit 22 derives a moving direction, a speed, and a trajectory as the identification information on the basis of a tracking result of the object.

Note that a cycle at which the class identification unit 22 generates the image from the pixel data may be the same as or shorter than a cycle (frame rate) at which the imaging sensor 14*b* obtains the image data.

Furthermore, regarding the object from which the identification information has been derived, the class identification unit 22 extracts an image portion corresponding to the object from the image data input from the imaging sensor 14*b*. Then, the class identification unit 22 derives an external characteristic as the identification information by image analysis on the basis of the extracted image portion. Note that a known method can be used for the image analysis, and thus description thereof is omitted here.

The class identification unit 22 collates the wavelength of the light emitted by the illumination unit 3 and the identification information (moving direction, trajectory, speed, and external characteristic) derived for the detected object with the definition information according to the specified identification program to determine which target object the object is. Here, for example, in a case where the derived identification information of the object falls within the range indicated by the definition information of the target object, the class identification unit 22 identifies the derived object as the type indicated by the definition information.

These pieces of definition information are stored in the memory 11 by a method that varies depending on the identification program. For example, in the rule base identification program, definition information is preset by the user and stored in the memory 11. Furthermore, in the machine learning identification program, the definition information is generated and updated by machine learning in a learning mode and stored in the memory 11.

Thereafter, in step S5, the vibration measurement unit 23 determines whether the detected type of the target object is a target object whose vibration is to be measured on the basis of the type of the target object identified by the class identification unit 22. Here, it is determined whether the target object is an object that does not move by itself, that is, an object (for example, a fine particle) that moves only by a flow in water (vibration by a sound wave).

And, in a case where the detected type of the target object is not a target object whose vibration is to be measured (No in step S5), the processing proceeds to step S7. On the other hand, in a case where the detected type of the target object is a target object whose vibration is to be measured (Yes in step S5), the vibration measurement unit 23 performs vibration measurement processing of detecting and measuring a sound wave by measuring vibration of the target object on the basis of the image taken by the imaging unit 14 in step S6. Note that an example of the vibration measurement processing will be described later.

In step S7, the control unit 10 determines whether the measurement end condition specified in the measurement settings is satisfied. Then, the control unit 10 repeats steps S3 to S7 until the measurement end condition is satisfied and ends the processing in a case where the measurement end condition is satisfied (Yes in step S7).

4. Vibration Measurement Processing

Figure 5:
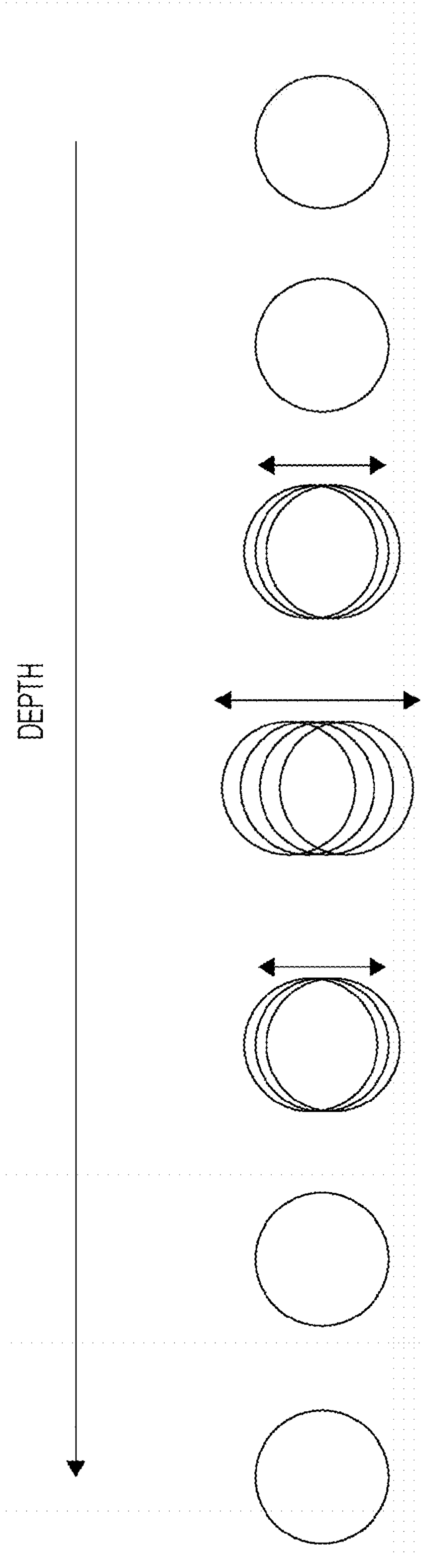
FIG. 5 is a diagram for explaining a target object vibrating by a sound wave generated in water.
Figure 6:
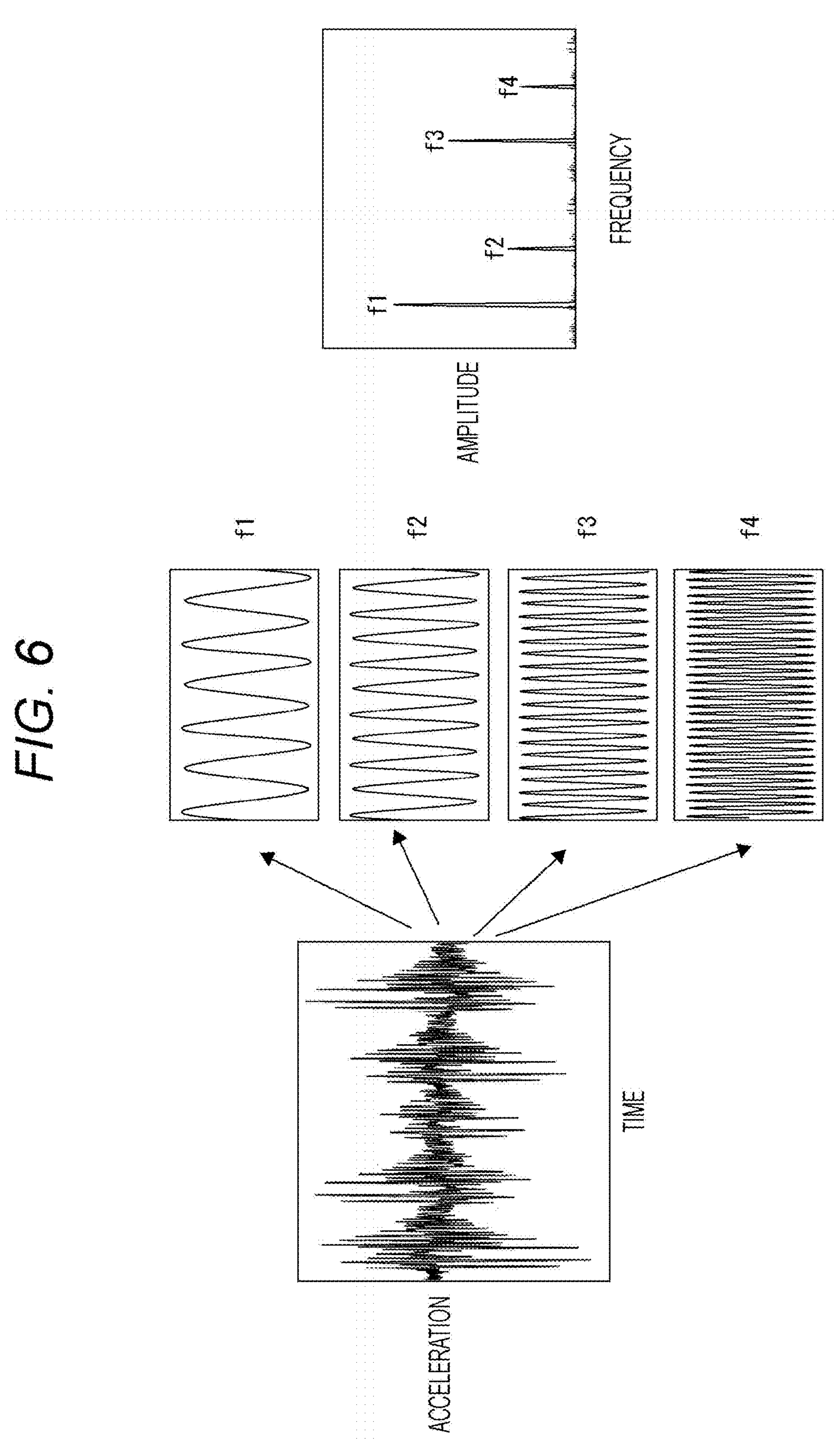
FIG. 6 is a diagram for explaining vibration measurement processing.

FIG. 5 is a diagram for explaining a target object vibrating by a sound wave generated in water. FIG. 6 is a diagram for explaining vibration measurement processing. In FIG. 5, the target object is indicated by a white circle, and the vibrating target object is illustrated by overlapping white circles.

For example, as illustrated in FIG. 5, it is assumed that a plurality of target objects is arranged in a depth direction in the water. Furthermore, it is assumed that third, fourth, and fifth target objects from the top are vibrated by sound waves generated in the water. Furthermore, it is assumed that the fourth target object from the top has a higher vibration frequency than the third and fifth target objects from the top.

In such a case, the first, second, sixth, and seventh target objects from the top do not move and thus are not shown in images taken at predetermined intervals by the vision sensor 14*a*.

On the other hand, the third, fourth, and fifth target objects from the top appear at different positions (pixels) in respective images.

As described above, a target object vibrated by a sound wave generated in water moves in images taken at predetermined intervals.

Therefore, the vibration measurement unit 23 executes distance measurement processing of measuring a distance of a target object in an imaging direction on the images successively taken at predetermined time intervals by the vision sensor 14*a*. Furthermore, the vibration measurement unit 23 calculates an acceleration between frames on the basis of the measured distance in the imaging direction as illustrated on the left side of FIG. 6. Note that the distance measurement processing will be described later in detail.

Thereafter, the vibration measurement unit 23 performs normalization such as overlap processing and window function processing on a waveform of the calculated acceleration. Then, the vibration measurement unit 23 performs fast Fourier transform as illustrated in the center of FIG. 6 on the normalized waveform of the acceleration to calculate an amplitude for each frequency as illustrated on the right side of FIG. 6.

Then, the vibration measurement unit 23 specifies (measures) a frequency component (f1 to f4 in FIG. 6) whose amplitude is larger than a predetermined threshold among frequency components whose amplitudes have been calculated as a frequency of a sound wave emitted in water.

5. Distance Measurement Processing

Next, the distance measurement processing will be described. The vibration measurement unit 23 executes the distance measurement processing on the basis of a rule base or machine learning distance measurement program.

Here, the rule base distance measurement processing and the machine learning distance measurement processing will be described by giving specific examples. Note that a method of calculating a distance of a target object is not limited to these, and other methods may be used.

5.1 Rule Base Distance Measurement Processing

Figure 7:
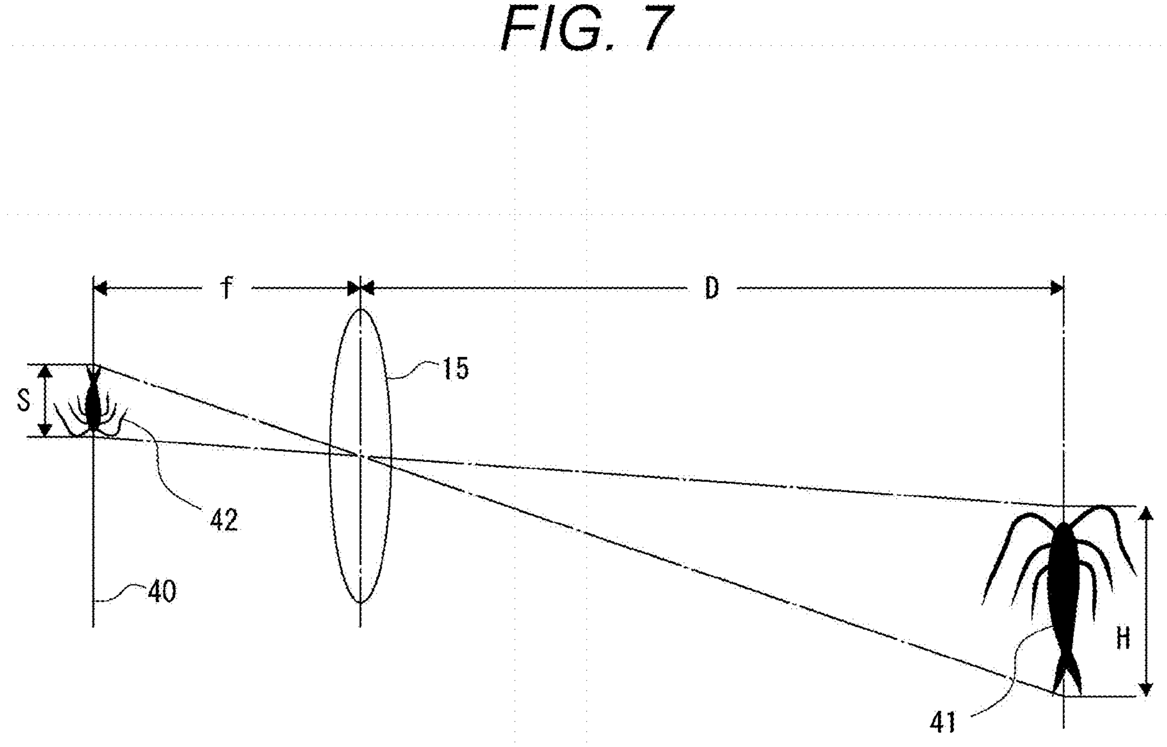
FIG. 7 is a diagram for explaining rule base distance measurement processing.

FIG. 7 is a diagram for explaining the rule base distance measurement processing. In the rule base distance measurement processing, a focal length f of the vision sensor 14*a* is stored in the memory 11 as known information.

Furthermore, statistical information (average size H) of each target object is stored in the memory 11. This is registered in advance by the user as a database.

And, in a case where a target object is specified from an image based on pixel data, the vibration measurement unit 23 reads out an average size H of the target object and the focal length f of the vision sensor 14*a* from the memory 11. Thereafter, the vibration measurement unit 23 calculates a longitudinal length s of an image 42 of the target object captured on an imaging surface 40 on the basis of, for example, the number of pixels in which the image 42 is captured.

Furthermore, the vibration measurement unit 23 calculates a distance D in the imaging direction from the measurement device 1 to the target object 41 by using formula (1).

$$D = fH/s \tag{1}$$

In this manner, the vibration measurement unit 23 calculates (measures) the distance D from the measurement device 1 to the actual target object 41 every time an image based on pixel data is acquired (every time the target object is detected from the image).

5.2 Machine Learning Distance Measurement Processing

Figure 8:
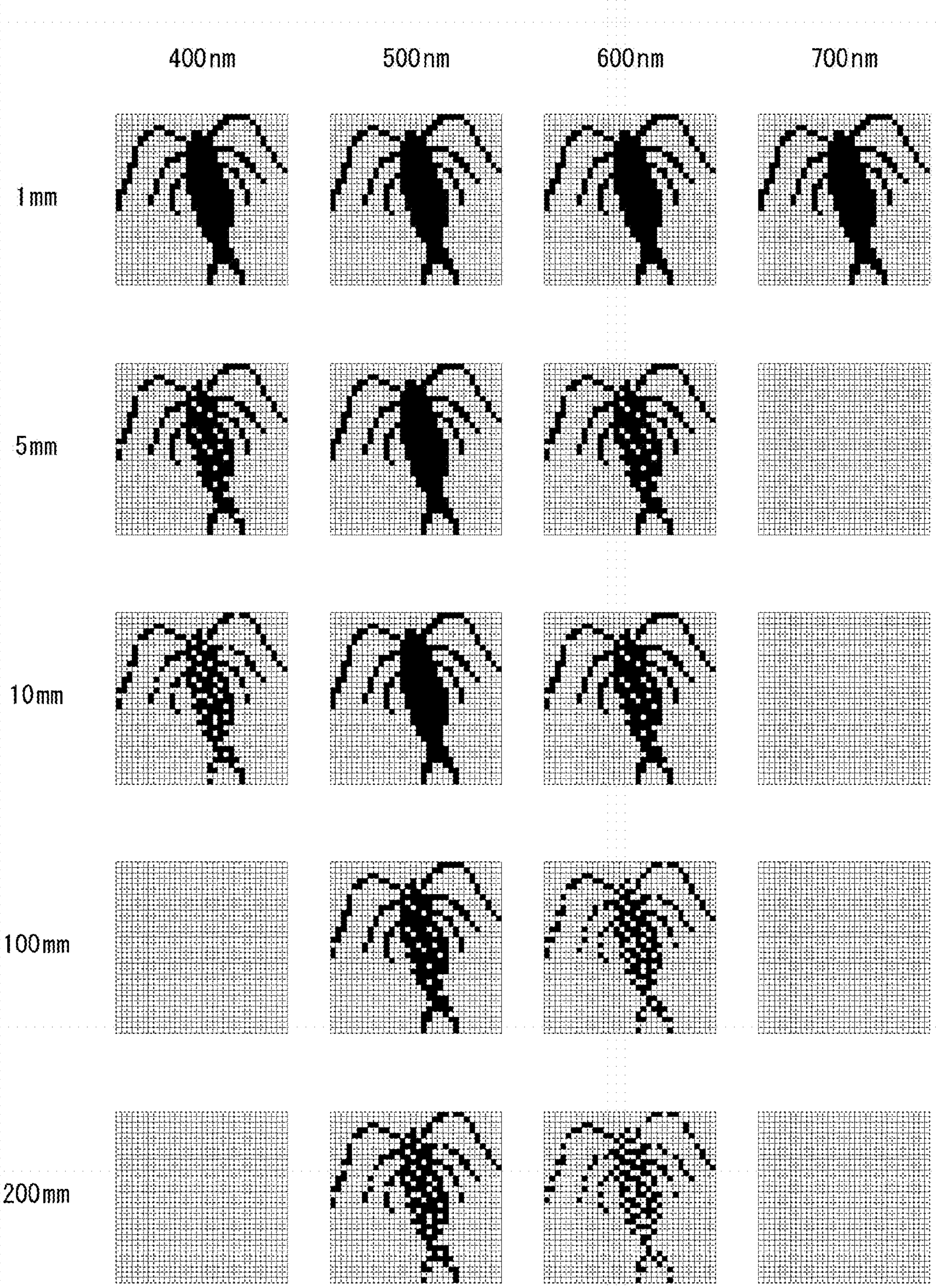
FIG. 8 is a diagram for explaining images used as teacher data.
Figure 9:
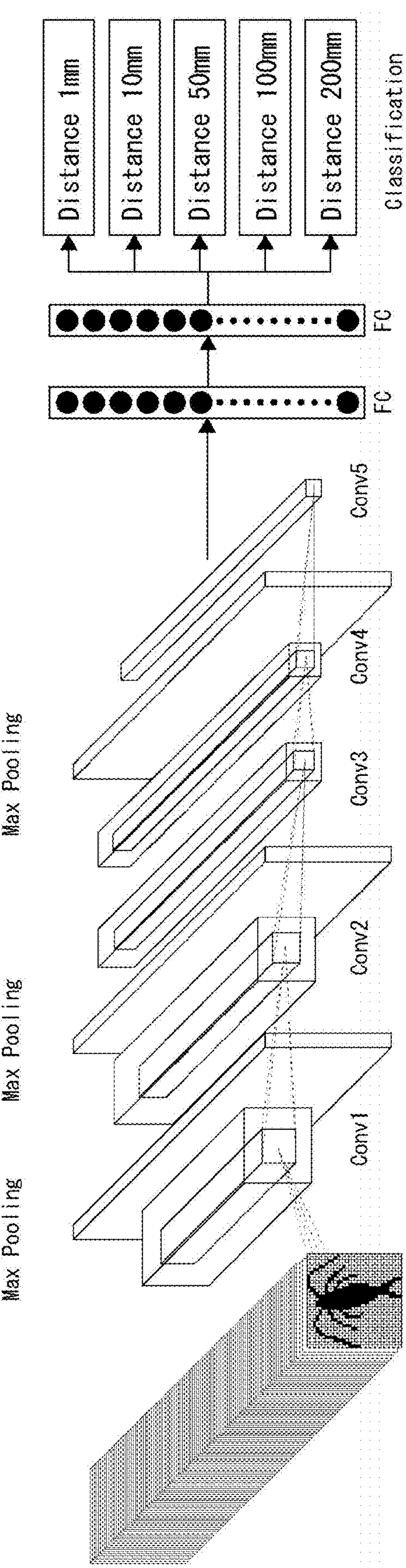
FIG. 9 is a model diagram of deep learning.

FIG. 8 is a diagram for explaining images used as teacher data. FIG. 9 is a model diagram of deep learning.

In the machine learning distance measurement processing, for example, machine learning is performed by using images that are teacher data such as the ones illustrated in FIG. 8 to generate a model (architecture) for the distance measurement processing.

Specifically, images are prepared in advance in which a known target object is imaged by the vision sensor 14*a* in 153 patterns in total, specifically, five patterns in which the distance from the measurement device 1 to the target object in the imaging direction is 1 mm, 5 mm, 10 mm, 100 mm, and 200 mm, and 31 patterns in which the wavelength of emitted light is varied from 400 nm to 700 nm every 10 nm.

Then, for each of the prepared images, the vibration measurement unit 23 detects a pixel group within a predetermined range where a motion is detected as a target object, and resizes the pixel group to 32 pixels×32 pixels, thereby generating images that are training data such as the ones illustrated in FIG. 8.

Note that FIG. 8 illustrates some of the images that are teacher data. Here, in the sea, an attenuation rate of light having a wavelength of approximately 500 nm is low, and an attenuation rate of light having a wavelength smaller than approximately 500 nm and light having a wavelength larger than approximately 500 nm increases as a distance from approximately 500 nm increases.

Furthermore, as the distance from the measurement device 1 to the target object increases, an arrival rate of light decreases.

Therefore, as illustrated in FIG. 8, in an image capturing a target object, the target object is more clearly captured as the target object is closer to the measurement device 1 and as the wavelength of emitted light is closer to 500 nm. On the other hand, the target object is less clear or is not captured at all as the target object is farther from the measurement device 1 and as the wavelength of the emitted light is farther from 500 nm.

When the images that are teacher data are resized, the vibration measurement unit 23 performs machine learning using the teacher data including these images in a deep neural network, as illustrated in FIG. 9. This model includes, for example, five convolution layers (Conv1 to Conv5), three pooling layers (Max Pooling), and two fully connected layers (FC). Then, by machine learning, a model that finally outputs a one-dimensional classification vector having five elements from Distance 1 mm to Distance 200 mm is generated and stored in the memory 11.

Such machine learning in the deep neural network is performed for each target object, and a model for each target object is generated and stored in the memory 11.

And, in a case where a type of target object is specified by the class identification unit 22, the vibration measurement unit 23 reads out a model of the specified type from the memory 11. Furthermore, the vibration measurement unit 23 resizes a target object portion in an image taken by the vision sensor **14*a* to 32 pixels×32 pixels, and inputs the resized image to the read model. As a result, a value of a one-dimensional classification vector having five elements from Distance 1 mm to Distance 200 mm is output. Then, the vibration measurement unit 23** outputs (measures) an element (any one of Distance 1 mm to Distance 200 mm) having the highest value among the five elements as a distance of the target object in the imaging direction.

6. Use Examples

Hereinafter, use examples of the measurement device 1 will be described by giving a use example 1 and a use example 2.

6.1 Use Example 1

Figure 10:
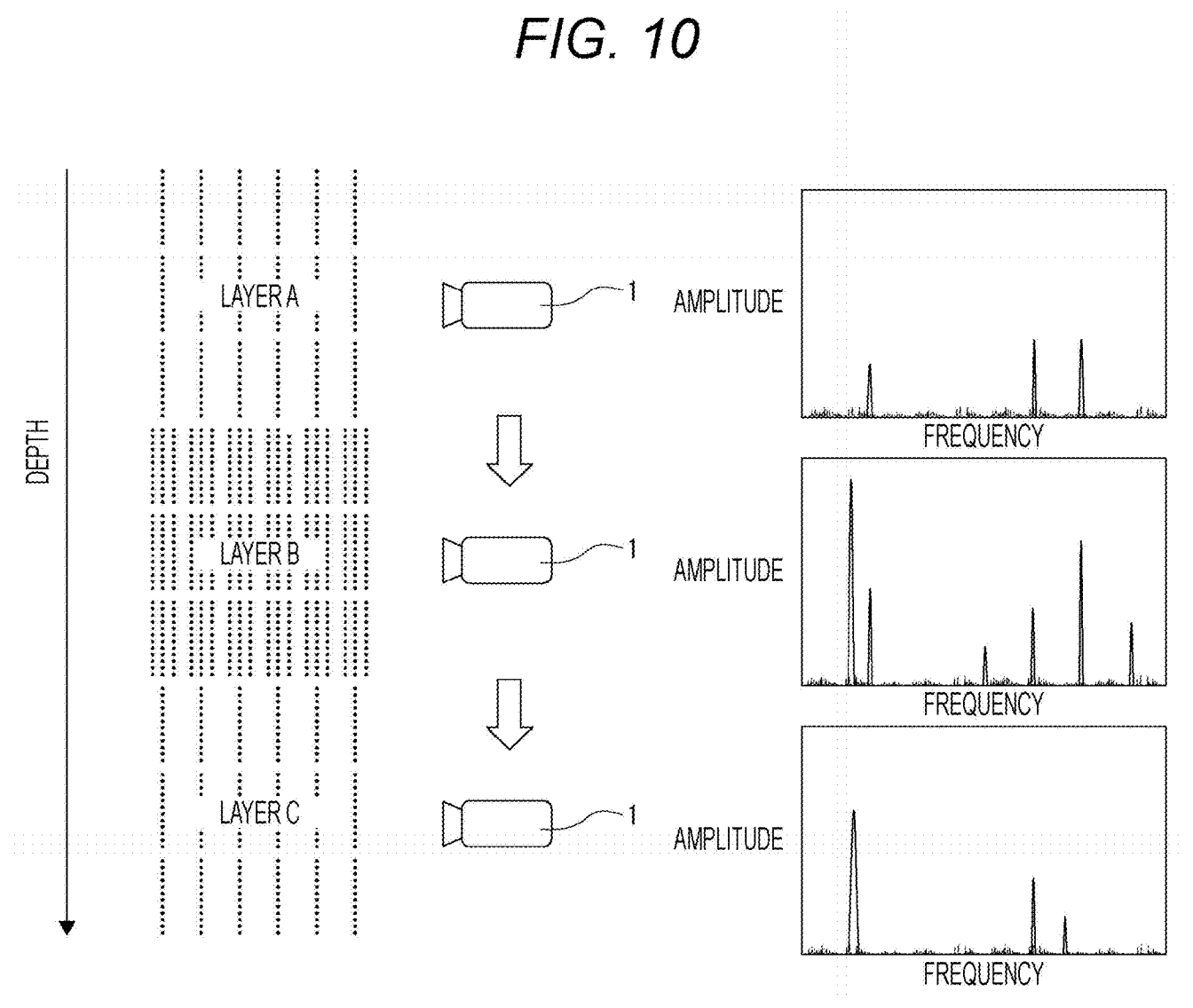

FIG. 10 is a diagram for explaining the use example 1. Note that, on the left side of FIG. 10, a target object is indicated by a black circle, and a state in which the target object is vibrating is indicated by black circles arranged side by side. Furthermore, FIG. 10 illustrates a state in which three different layers (layers A, B, and C) are distributed in a depth direction of the sea, and sound waves (vibrations) detected in the respective layers are different.

Here, it is known that in the sea, a speed of sound is determined by three parameters: a water temperature, a saline concentration, and a water pressure. And, the saline concentration has the least influence as a parameter for determining the speed of sound, and does not change much depending on the location.

On the other hand, the water temperature decreases as a water depth increases in a range from a sea surface to a depth of approximately 800 m. And, the speed of sound decreases as the water temperature decreases. A layer in which the water temperature decreases as a depth increases as described above is called a thermocline (layer A).

Furthermore, the water temperature is constant at about 4° C. in a range deeper than 1500 m from the sea surface, while the water pressure increases as the water depth increases. And, the speed of sound increases as the water pressure increases. Such a layer is called a deep isothermal layer (layer C).

Furthermore, between the thermocline and the deep isothermal layer (water depth of 800 m to 1500 m), there is a depth at which the speed of sound becomes minimum, and works like a kind of lens with respect to a propagation path of sound, so that energy radiated in this layer tends to remain in the layer. Therefore, this layer has a characteristic that sound can propagate up to a very long distance even in a case where sound output is moderate. Such a layer is a layer having a slower sound speed than other layers, and is called a deep sound channel or SOFAR layer.

Therefore, in the use example 1, the measurement device 1 is used to search the SOFAR layer in which a sound wave propagates over a long distance.

As illustrated in FIG. 10, the measurement device 1 is moved in a water depth direction (gravity direction). And, while the measurement device 1 is moved, images are sequentially taken by the imaging unit 14. The class identification unit 22 identifies a type of target object each time an image is taken, and when the target object whose vibration is to be measured is identified, the vibration measurement unit 23 measures vibration of the target object as described above.

As a result, as illustrated on the right side of FIG. 10, in the SOFAR layer of the layer B, a sound wave having a frequency and an amplitude different from those in the thermocline of the layer A and the deep isothermal layer of the layer C is measured. In particular, in the SOFAR layer of the layer B, a sound wave of a frequency having a large amplitude is measured.

Therefore, the vibration measurement unit 23 detects the SOFAR layer by comparing a frequency and an amplitude of a sound wave supposed to be measured in the SOFAR layer and the measured frequency and amplitude of the sound wave.

Note that the frequency and amplitude of the sound wave supposed to be measured in the SOFAR layer may be stored in the memory 11 in advance by the user (rule base) or may be learned by machine learning.

6.2 Use Example 2

Figure 11:
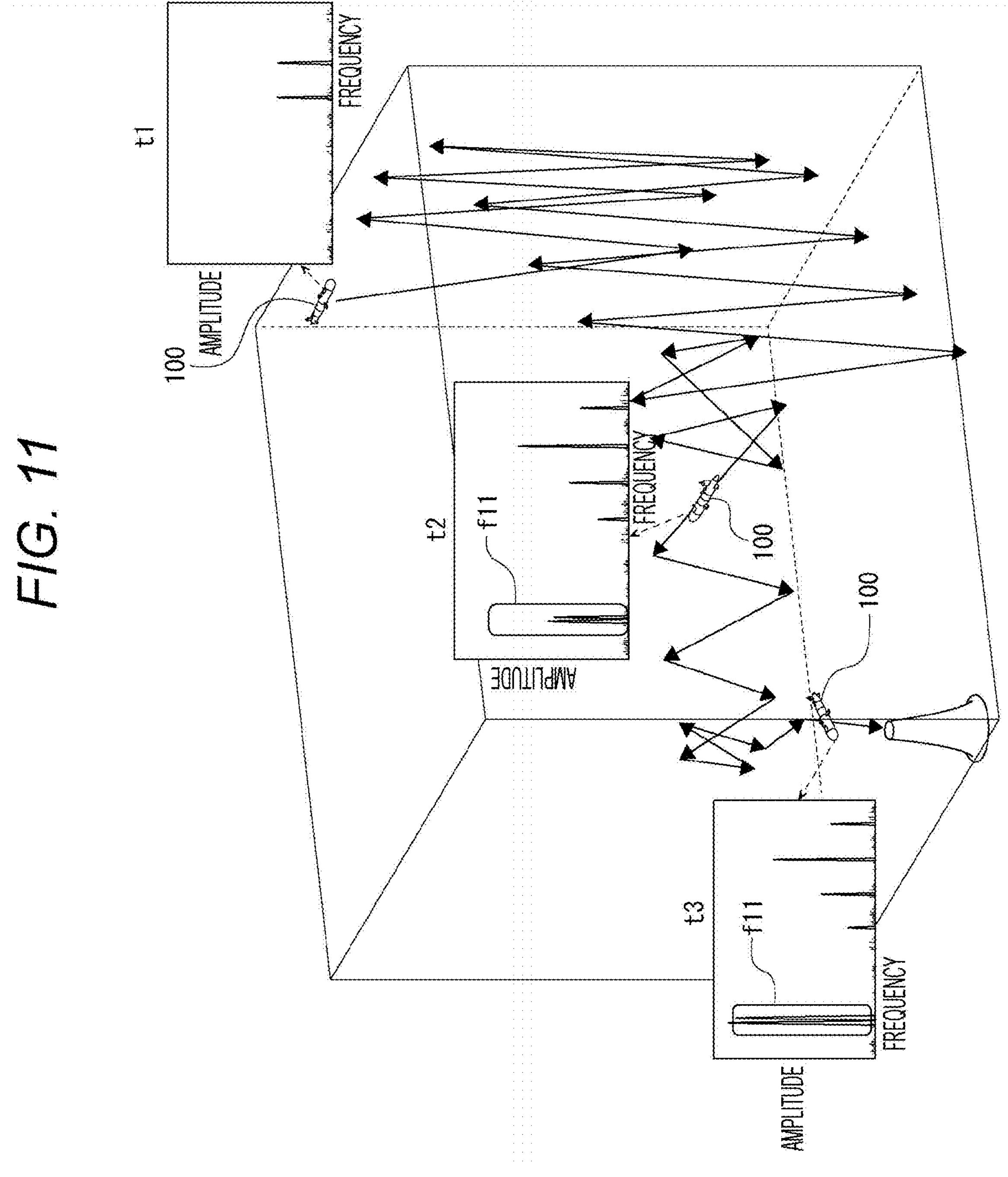
FIG. 11 is a diagram for explaining a use example 2.

FIG. 11 is a diagram for explaining the use example 2. In the use example 2, a hydrothermal vent is searched for. Here, a sound wave having a predetermined frequency is generated from the hydrothermal vent.

Therefore, in the use example 2, the hydrothermal vent is searched for by finding and approaching the sound wave generated from the hydrothermal vent.

In the use example 2, the measurement device 1 is mounted on a moving unit 100 such as an underwater robot or a submarine. The moving unit 100 may be moved by a user operation or may be moved on the basis of control of the control unit 10.

Here, a case where the moving unit 100 moves on the basis of control of the control unit 10 will be described as an example.

First, the control unit 10 moves the moving unit 100 randomly, for example, as indicated by arrows in FIG. 11. And, during the random movement, images are sequentially taken by the imaging unit 14. The class identification unit 22 identifies a type of target object each time an image is taken, and when the target object whose vibration is to be measured is identified, the vibration measurement unit 23 measures vibration of the target object as described above.

Furthermore, the vibration measurement unit 23 determines whether a frequency f11 of the sound wave generated from the hydrothermal vent is detected. And, for example, since the sound wave having the frequency f11 is not detected at time t1, the moving unit 100 is further randomly moved.

Thereafter, for example, when the sound wave having the frequency f11 is detected at time t2, the control unit 10 moves the moving unit 100 in a direction in which an amplitude of the frequency f11 increases.

By thus moving the moving unit 100 in the direction in which the amplitude of frequency f11 increases, for example, a place where the amplitude of frequency f11 becomes the largest at time t3 is detected as the hydrothermal vent.

In this manner, the control unit 10 moves the imaging unit 14 (measurement device 1) on the basis of the measured sound wave of the predetermined frequency. Furthermore, the control unit 10 moves the imaging unit 14 (measurement device 1) in a direction in which an amplitude of the measured sound wave of the predetermined frequency increases.

7. Another Configuration Example of Measurement Device

Note that the embodiments are not limited to the specific examples described above and may be configured as various modification examples.

In the embodiment described above, the measurement device 1 includes one illumination unit 3. However, the number of illumination units 3 is not limited to one, and a plurality of illumination units 3 may be provided.

Figure 12:
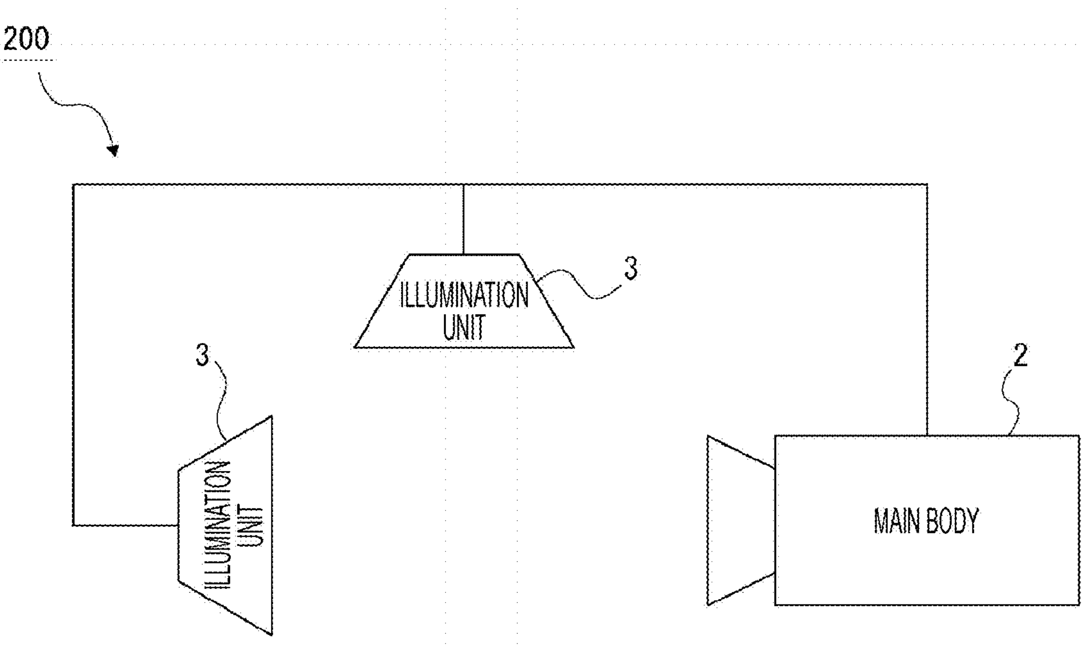
FIG. 12 is a diagram for explaining a configuration of a measurement device according to a modification.

FIG. 12 is a view for explaining a configuration of a measurement device 200 according to a modification. As illustrated in FIG. 12, the measurement device 200 according to the modification includes one main body 2 and two illumination units 3. The two illumination units 3 are arranged so as to be capable of emitting light in directions orthogonal to each other, and can emit light having wavelengths different from each other to an imaging range.

In such a measurement device 200, light of different wavelengths can be emitted from the two illumination units 3, and therefore identification information of a target object (microorganism) exhibiting taxis in response to light of different wavelengths can be derived by one measurement, and measurement can be efficiently performed.

Figure 13:
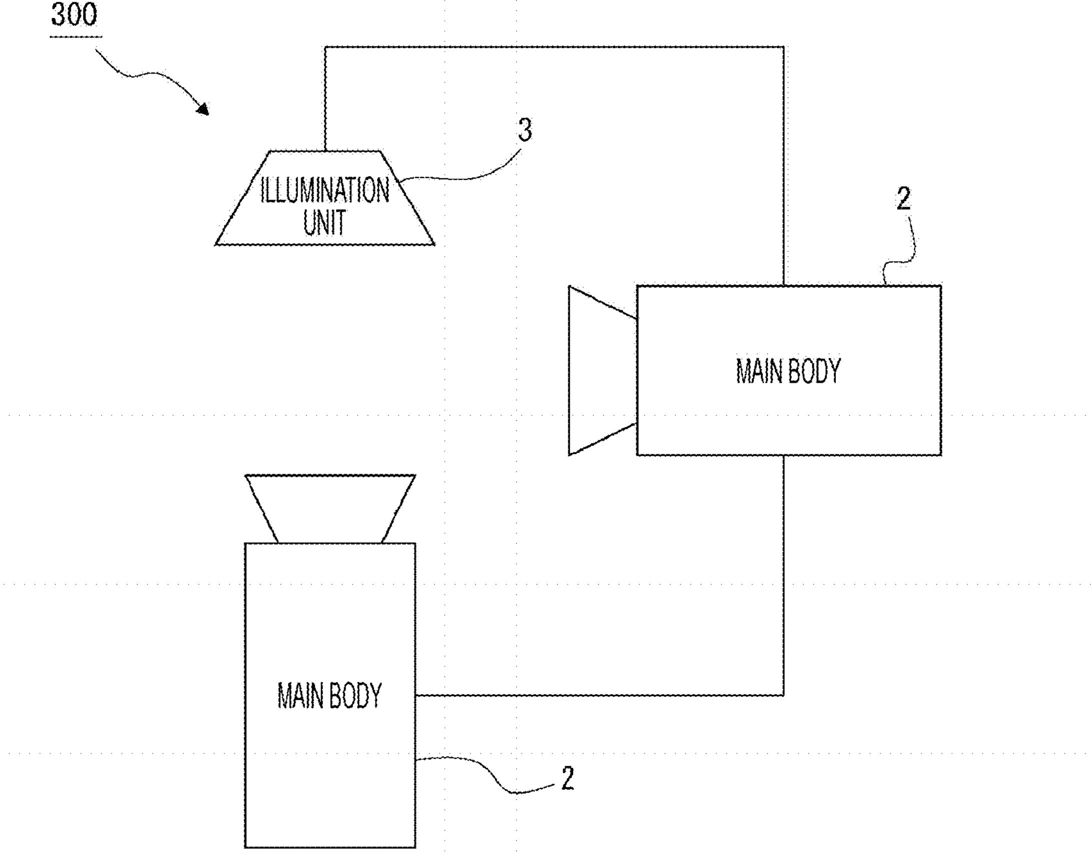
FIG. 13 is a diagram for explaining a configuration of a measurement device according to a modification.

FIG. 13 is a diagram for explaining a configuration of a measurement device 300 according to a modification. As illustrated in FIG. 13, the measurement device 300 according to the modification includes two main bodies 2 and one illumination unit 3. The two main bodies 2 are arranged so as to be capable of taking images in directions orthogonal to each other.

In such a measurement device 300, images can be taken by the two main bodies 2 (imaging units 14), and therefore three-dimensional movement of a target object can be detected, and measurement can be performed more efficiently.

Note that, in a case where the two main bodies 2 are provided, one main body 2 may include only the imaging unit 14.

Furthermore, in the above embodiment, the imaging unit 14 includes the vision sensor 14*a* and the imaging sensor 14*b*. However, the imaging unit 14 may include only one of the vision sensor 14*a* and the imaging sensor 14*b* as long as an image from which at least information regarding a position of a target object in an imaging direction can be measured can be taken. Furthermore, the imaging unit 14 may include a single photon avalanche diode (SPAD) sensor instead of the vision sensor 14*a* and the imaging sensor 14*b*.

In the above embodiment, a type of target object is identified by deriving identification information on the basis of pixel data acquired by the vision sensor 14*a* and image data acquired by the imaging sensor 14*b*. However, if the type of target object can be identified on the basis of at least one of the pixel data acquired by the vision sensor 14*a* or the image data acquired by the imaging sensor 14*b*, the type of target object may be identified by another method.

In the above embodiment, vibration of the target object is measured after the type of target object is identified by the class identification unit 22. However, the measurement device 1 may measure the vibration of the target object without identifying the type of target object.

8. Summary of Embodiment

As described above, the measurement device 1 of the embodiment includes the imaging control unit 21 that causes the imaging unit 14 to image a predetermined target object in water, and the measurement unit (vibration measurement unit 23) that measures a sound wave in water on the basis of an image taken by the imaging unit 14.

With this arrangement, the measurement device 1 can measure a sound wave in water with a simple configuration. Furthermore, the measurement device 1 can measure an ultra-low frequency sound wave of less than 1 Hz.

Therefore, the measurement device 1 can efficiently measure a sound wave propagating in water.

In the measurement device 1 according to the present technology described above, it is conceivable that the imaging unit 14 includes the vision sensor 14*a* that acquires pixel data asynchronously according to an amount of light incident on each of a plurality of pixels arranged two-dimensionally.

With this arrangement, it is possible to read only pixel data of a pixel in which an event has occurred and measure a target object on the basis of the pixel data. Therefore, the measurement device 1 can achieve high-speed imaging, reduction in power consumption, and reduction in calculation cost of image processing by automatic separation from background.

In the measurement device 1 according to the present technology described above, it is conceivable that the measurement unit measures a frequency of a sound wave by measuring a frequency of vibration of a target object.

With this arrangement, the measurement device 1 can measure a sound wave in water on the basis of vibration of a target object captured in an image taken by the imaging unit 14.

In the measurement device 1 according to the present technology described above, it is conceivable that the identification unit (class identification unit 22) that identifies a type of target object on the basis of an image taken by the imaging unit is provided, and the measurement unit measures a sound wave on the basis of the type of target object identified by the identification unit.

With this arrangement, in a case where a type of target object that is not vibrated (moved) by a sound wave is detected, it is possible to avoid measuring a sound wave on the basis of vibration of this type of target object.

Therefore, the measurement device 1 can accurately measure a sound wave.

In the measurement device 1 according to the present technology described above, it is conceivable that the measurement unit measures a sound wave in a case where the type of target object identified by the identification unit is a type that does not move by itself.

This makes it possible to avoid measuring a sound wave on the basis of movement that is not caused by a sound wave.

Therefore, the measurement device 1 can accurately measure a sound wave.

In the measurement device 1 according to the present technology described above, it is conceivable that the measurement unit measures a frequency of vibration of the target object on the basis of images taken by the imaging unit at predetermined time intervals.

With this arrangement, the measurement device 1 can measure a sound wave in water with a simple configuration.

In the measurement device 1 according to the present technology described above, it is conceivable that the imaging unit sequentially performs imaging while moving an imaging range.

With this arrangement, it is possible to detect a sound wave in a wide range in water.

In the measurement device 1 according to the present technology described above, it is conceivable that a movement control unit (control unit 10) that moves the imaging unit is provided, and the movement control unit moves the imaging unit on the basis of a sound wave of a predetermined frequency measured by the measurement unit.

With this arrangement, it is possible to search for a generation source of a sound wave to be detected and to find a layer in which a sound wave to be detected is generated.

In the measurement device 1 according to the present technology described above, it is conceivable that the movement control unit moves the imaging unit in a direction in which an amplitude of a sound wave of a predetermined frequency measured by the measurement unit increases.

With this arrangement, it is possible to specify a position of a generation source of a sound wave to be detected.

In the measurement device 1 according to the present technology described above, it is conceivable that the measurement unit detects a specific layer in water on the basis of the measured sound wave.

In the measurement device 1 according to the present technology described above, it is conceivable that the layer to be detected is a layer in which a sound speed is slower than in other layers.

With this arrangement, it is possible to find a layer in which a sound wave to be detected is generated.

A measurement method according to the present technology described above includes causing an imaging unit to image a predetermined target object in water and measuring a sound wave in the water on the basis of an image taken by the imaging unit.

A program according to the present technology described above causes an information processing apparatus to perform processing including causing an imaging unit to image a predetermined target object in water and measuring a sound wave in the water on the basis of an image taken by the imaging unit.

Such a program can be recorded in advance in an HDD as a storage medium built in a device such as a computer device, a ROM in a microcomputer having a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as what is called package software.

Furthermore, such a program can be installed from the removable recording medium into a personal computer or the like, or can be downloaded from a download site via a network such as a local area network (LAN) or the Internet.

Furthermore, such a program is suitable for providing the information processing device of the embodiment in a wide range. For example, by downloading the program to a mobile terminal device such as a smartphone, a tablet, or the like, a mobile phone, a personal computer, game equipment, video equipment, a personal digital assistant (PDA), or the like, such equipment can be caused to function as the information processing apparatus of the present disclosure.

Note that effects described in the present description are merely examples and are not limited, and other effects may be provided.

9. Present Technology

The present technology can also be configured as follows.

(1)

A measurement device including:

an imaging control unit that causes an imaging unit to image a predetermined target object in water; and a measurement unit that measures a sound wave in the water on the basis of an image taken by the imaging unit.

(2)

The measurement device according to (1), in which the imaging unit includes a vision sensor that acquires pixel data asynchronously according to an amount of light incident on each of a plurality of pixels arranged two-dimensionally.

(3)

The measurement device according to (1) or (2), in which the measurement unit measures a frequency of the sound wave by measuring a frequency of vibration of the target object.

(4)

The measurement device according to any one of (1) to (3), further including an identification unit that identifies a type of target object on the basis of an image taken by the imaging unit, in which the measurement unit measures the sound wave on the basis of the type of target object identified by the identification unit.

(5)

The measurement device (4), in which the measurement unit measures the sound wave in a case where the type of target object identified by the identification unit is a type that does not move by itself.

(6)

The measurement device according to (3), in which the measurement unit measures the frequency of the vibration of the target object on the basis of images taken by the imaging unit at predetermined time intervals.

(7)

The measurement device according to any one of (1) to (6), in which the imaging unit sequentially performs imaging while moving an imaging range.

(8)

The measurement device according to any one of (1) to (7), further including a movement control unit that moves the imaging unit, in which the movement control unit moves the imaging unit on the basis of a sound wave of a predetermined frequency measured by the measurement unit.

(9)

The measurement device according to (8), in which the movement control unit moves the imaging unit in a direction in which an amplitude of the sound wave of the predetermined frequency measured by the measurement unit increases.

(10) The measurement device according to any one of (1) to (9), in which the measurement unit detects a specific layer in the water on the basis of the measured sound wave.

(11)

The measurement device according to (10), in which the layer to be detected is a layer in which a sound speed is slower than in other layers.

(12)

A measurement method including:

causing an imaging unit to image a predetermined target object in water; and measuring a sound wave in the water on the basis of an image taken by the imaging unit.

(13)

A program for causing a measurement device to execute processing including:

causing an imaging unit to image a predetermined target object in water; and measuring a sound wave in the water on the basis of an image taken by the imaging unit.

REFERENCE SIGNS LIST

1 Measurement device
3 Illumination unit
10 Control unit
14 Imaging unit
**14*a*** Vision sensor
**14*b*** Imaging sensor
21 Imaging control unit
22 Class identification unit
23 Vibration measurement unit

The invention claimed is:

1. A measurement device comprising:

circuitry including a CPU that is configured to cause an image sensor to take an image of a target object in water, measure a sound wave in the water based on the image taken by the image sensor, and cause the image sensor to move based on a sound wave of a predetermined frequency that was measured.

2. The measurement device according to claim 1, wherein the image sensor includes a vision sensor configured to acquire pixel data asynchronously according to an amount of light incident on each of a plurality of pixels arranged two-dimensionally.

3. The measurement device according to claim 1, wherein the circuitry is further configured to measure a frequency of the sound wave by measuring a frequency of vibration of the target object.

4. The measurement device according to claim 3, wherein the circuitry is further configured to measure the frequency of the vibration of the target object based on images taken by the image sensor at predetermined time intervals.

5. The measurement device according to claim 1, wherein the circuitry is further configured to identify a type of the target object based on the image taken by the image sensor, and measure the sound wave based on the type of the target object that was identified.

6. The measurement device according to claim 5, wherein the circuitry is further configured to measure the sound wave in a case where it is determined, based on the type of the target object that was identified, that the target object is an object that does not move by itself.

7. The measurement device according to claim 1, wherein the image sensor sequentially performs imaging while moving an imaging range.

8. The measurement device according to claim 1, wherein the circuitry is further configured to cause the image sensor to move in a direction in which an amplitude of the sound wave of the predetermined frequency increases.

9. The measurement device according to claim 1, wherein the circuitry is further configured to detect a specific layer in the water based on the sound wave that was measured.

10. The measurement device according to claim 9, wherein the specific layer to be detected is a layer in which a sound speed is slower than in other layers.

11. The measurement device according to claim 1, further comprising:

a light source configured to emit light of different wavelengths in the water, wherein the circuitry is further configured to cause the image sensor to take images with the light of the different wavelengths.

12. The measurement device according to claim 1, wherein the circuitry is further configured to measure a distance from the measurement device to the target object in an imaging direction.

13. A measurement method comprising:

causing an image sensor to take an image of a target object in water;

measuring a sound wave in the water based on the image taken by the image sensor; and causing the image sensor to move based on a sound wave of a predetermined frequency that was measured.

14. The measurement method according to claim 13, wherein the image sensor includes a vision sensor configured to acquire pixel data asynchronously according to an amount of light incident on each of a plurality of pixels arranged two-dimensionally.

15. The measurement method according to claim 13, further comprising:

measuring a frequency of the sound wave by measuring a frequency of vibration of the target object.

16. The measurement method according to claim 15, further comprising:

measuring the frequency of the vibration of the target object based on images taken by the image sensor at predetermined time intervals.

17. The measurement method according to claim 13, further comprising:

identifying a type of the target object based on the image taken by the image sensor, and measuring the sound wave based on the type of the target object that was identified.

18. The measurement method according to claim 13, further comprising:

causing the image sensor to move in a direction in which an amplitude of the sound wave of the predetermined frequency increases.

19. The measurement method according to claim 13, further comprising:

causing the image sensor to take images with light of different wavelengths.

20. A non-transitory computer-readable medium storing a program for causing a measurement device to execute processing comprising:

causing an image sensor to take an image of a target object in water;

measuring a sound wave in the water based on the image taken by the image sensor; and causing the image sensor to move based on a sound wave of a predetermined frequency that was measured.

* * * * *